(12) United States Patent
Masters

(10) Patent No.: US 6,457,276 B1
(45) Date of Patent: Oct. 1, 2002

(54) RADIAL FLORAL ARRANGEMENT APPARATUS

(76) Inventor: David Immel Masters, 929 Northwood #1, Incline Village, NV (US) 89450

( * ) Notice: Subject to any disclaimer, the term of this patent is extended or adjusted under 35 U.S.C. 154(b) by 0 days.

(21) Appl. No.: 09/545,724

(22) Filed: Apr. 8, 2000

Related U.S. Application Data

(60) Provisional application No. 60/141,924, filed on Jun. 30, 1999, and provisional application No. 60/128,919, filed on Apr. 12, 1999.

(51) Int. Cl.⁷ .................................................. A01G 5/00
(52) U.S. Cl. .................. 47/41.01; 47/41.11; 428/23
(58) Field of Search ............................. 47/41.01, 41.12, 47/41.13, 41.14, 41.15, 66.6, 66.1, 65, 47, 41.11, 41.1; 428/23, 17; 211/13.1; A01G 5/00

(56) References Cited

U.S. PATENT DOCUMENTS

| 165,456 | A | * | 7/1875 | Vanstone | |
| 5,301,463 | A | * | 4/1994 | Domurat | 47/41.01 |
| 5,454,189 | A | * | 10/1995 | Graham et al. | 47/41.12 |
| 5,477,637 | A | * | 12/1995 | Aldrich | 47/41.01 |
| D386,715 | S | * | 11/1997 | Graham et al. | D11/143 |
| 5,683,762 | A | * | 11/1997 | Banschick | 428/4 |
| D416,514 | S | * | 11/1999 | Koo | D11/130 |
| 6,004,635 | A | * | 12/1999 | Hon | 428/23 |

FOREIGN PATENT DOCUMENTS

| JP | 410229751 A | * | 9/1998 | A01G/5/02 |

* cited by examiner

Primary Examiner—Peter M. Poon
Assistant Examiner—Andrea Valenti
(74) Attorney, Agent, or Firm—Greenberg Traurig, LLP

(57) ABSTRACT

A method and apparatus for arranging flowers without a vase. A series of nested members, each having a plurality of flower stem receiving channels, preferably between two and eight flower channels, are placed in nested configuration. Flower stems are placed in each of the receiving channels and the next larger member is placed over the stems. Larger members, for holding more flowers, can be placed over the next larger size. Preferably, one to four layers of members are used to create the flower arrangement.

32 Claims, 7 Drawing Sheets

RADIAL FLORAL ARRANGEMENT APPARATUS

CROSS-REFERENCE TO RELATED APPLICATION

This application claims the benefit of U.S. Provisional Application No. 60/128,919 filed Apr. 12, 1999, and U.S. Provisional Application No. 60/141,924 filed Jun. 30, 1999 both of whose entire contents are hereby incorporated by reference.

BACKGROUND OF THE INVENTION

1. Field of the Invention

This invention relates to apparatus for the floral industry; more particularly, this invention relates to apparatus to aid in arranging flowers; most particularly this invention relates to apparatus for steadying floral arraignments as they are made.

2. State of the Art

Currently, flowers are arranged at the florist by inserting cut flowers into floral foam. The floral foam is placed into a vase or similar container, and the flower stems are placed in foam. Other articles, such as babies' breath, fern and the like may also be placed in the foam. The problem with the foam is that the foam must be wetted and then placed in a vase or the like before the flowers or the like are placed in the arrangement. Arrangements made with floral foam can be asymmetric because the arranger may not balance the flowers in the arrangement. Moreover, the foam may fail to support some of the flowers in the arrangement, causing it to sag with time.

In the flower-by-wire industry, the arrangements are selected by the customer at a remote location from a book, paid for at the remote location, and then the arrangement is made based on the local florists best interpretation of the picture in the book. Any aid or guide to allow the consistent arrangement of flowers would be of great benefit to the industry and prevent misunderstandings about the nature of the flowers and arrangements ordered.

It would be advantageous to have a flower arranging device or aide that would allow the arranger to easily place the flowers in an arrangement symmetrically and permanently. It would be especially advantageous for the flower-by-wire industry, and allow consistent and reproducible flower arrangements to be made by all florists connected by the wire service.

SUMMARY OF THE INVENTION

This invention provides a method and apparatus for arranging flowers without a vase. A series of nested members, each having a plurality of flower stem receiving channels, preferably between two and eight flower channels, are placed in a nested configuration. Flower stems are placed in each of the receiving channels and the next larger member is placed over the stems. Larger members, for holding more flowers, can be placed over the next larger size. Preferably, one to four layers of members are used to create the flower arrangement.

In one aspect of this invention is an apparatus for arranging flowers comprising:
  a center member having a plurality of flower channels on the outer side surface; and
  at least one outer member having a plurality of flower channels on the out side surface, the center member nested inside the outer member.

A second aspect of this invention is a method for arranging flowers comprising:
  placing at least one stem of a flower in at least one flower channel of a center member;
  surrounding the central member with a surrounding member having a second plurality of flower channels;
  placing at least one stem of a flower in one of the second plurality of flower channels; and
  placing the arranged flowers in a display device.

A third aspect of this invention is an apparatus for arranging flowers comprising:
  a central member defining a central aperture and having a plurality of flower channels on the outer side surface; and
  at least one outer member having a first side member and second side member, the first and second side members having a means to join each other, and the out member having a plurality of flower channels on the out side surface, the center member nested inside the outer member.

DETAILED DESCRIPTION OF THE PREFERRED EMBODIMENT

Figure 1:
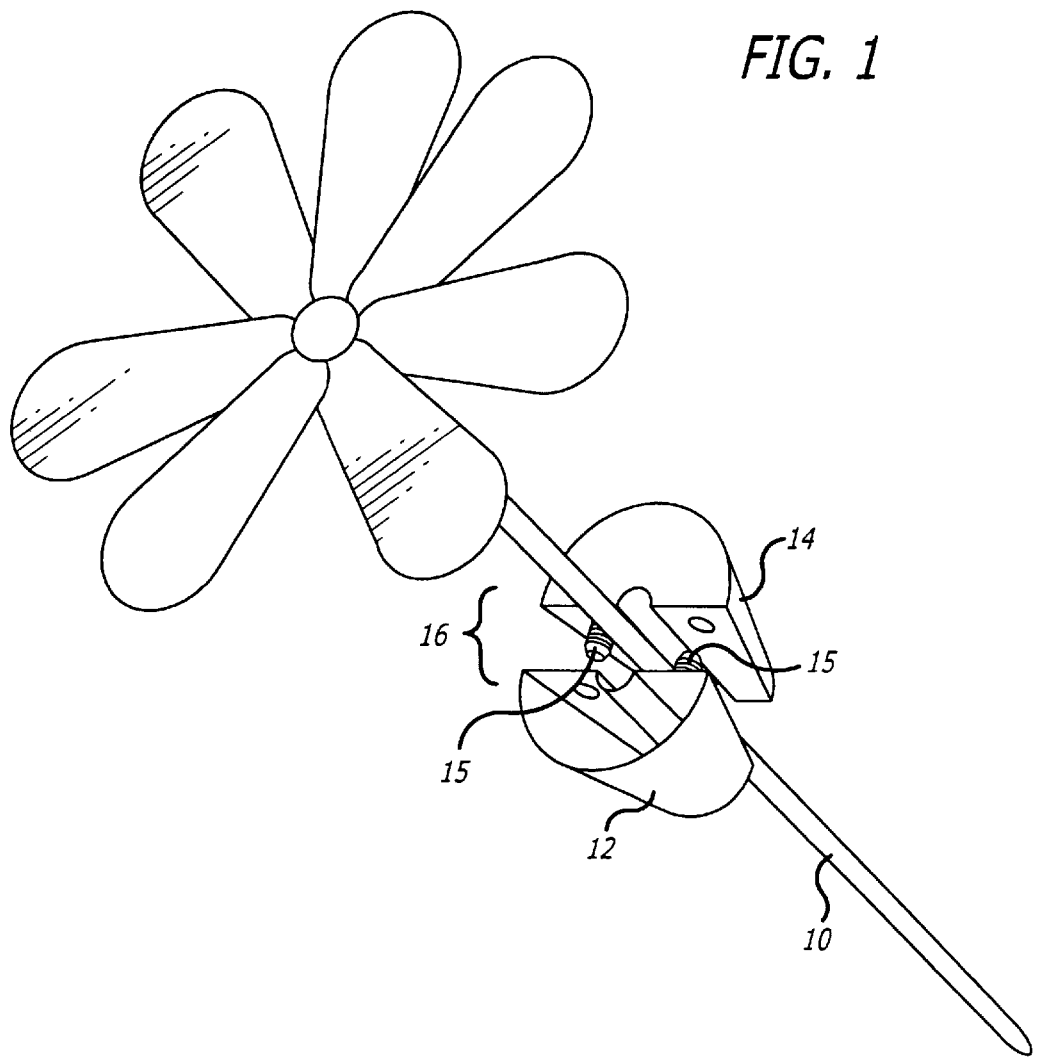
FIG. 1 shows a perspective view of an unassembled center member receiving a flower stem.

Referring now to FIG. 1, a flower stem 10 is encircled by a first side member 12 and a second side member 14 of a center member. The first and the second side members will be joined to form the center member 16.

Figure 2:
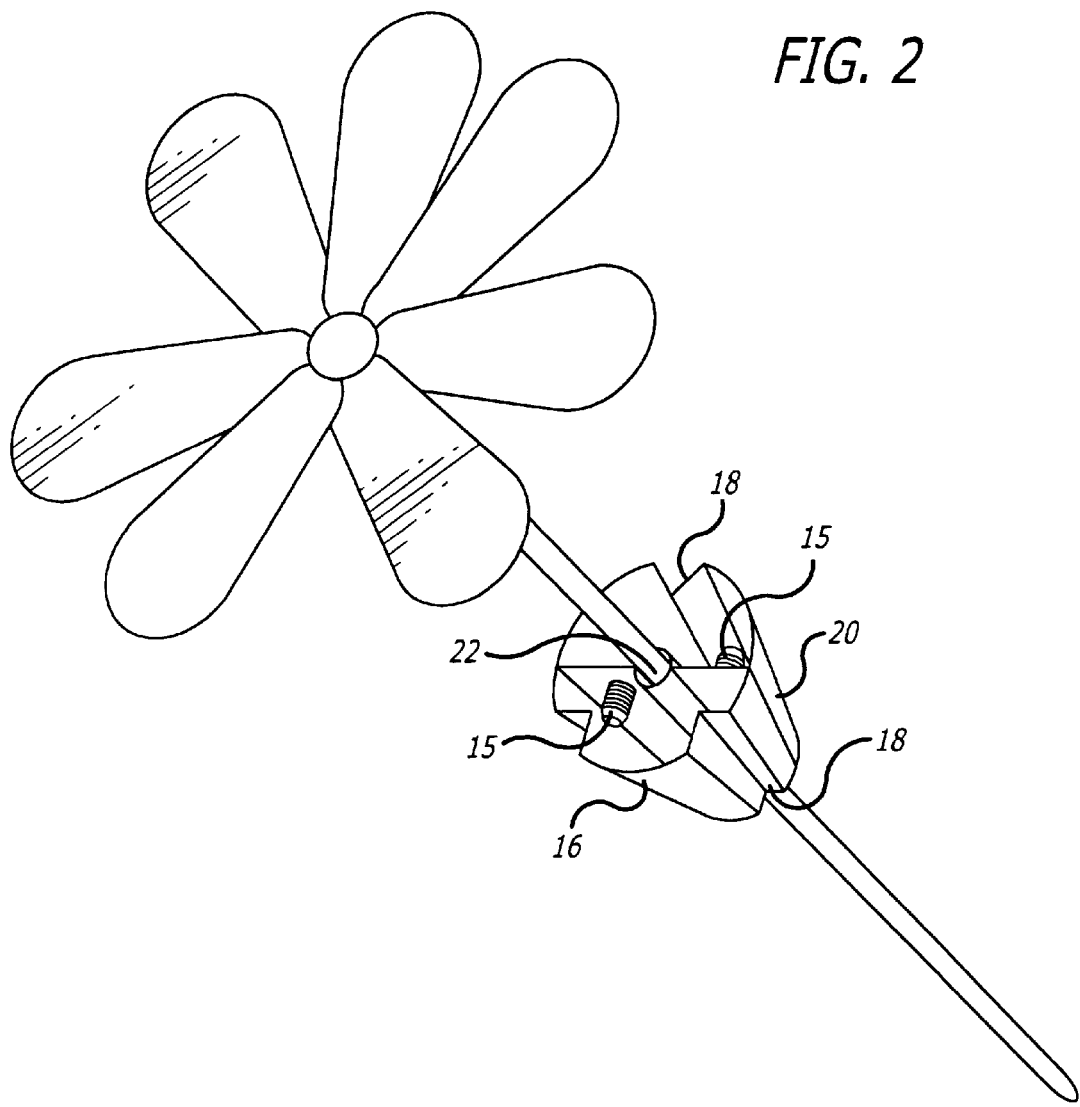
FIG. 2 shows a perspective view of the assembled center member of FIG. 1 with the received flower stem.

Referring to FIG. 2, the basic apparatus for arranging flowers includes a center member 16, shown here assembled, having a plurality of flower channels 18 on the outer side surface 20, and a newly created central orifice 22 in its center for the placement of a flower stem. There are flower channels disposed around the circumference of the outer side surface. Preferably there are between two and eight flower channels, more preferably between two and four, and most preferably three, as shown in this Fig.

Figure 3:
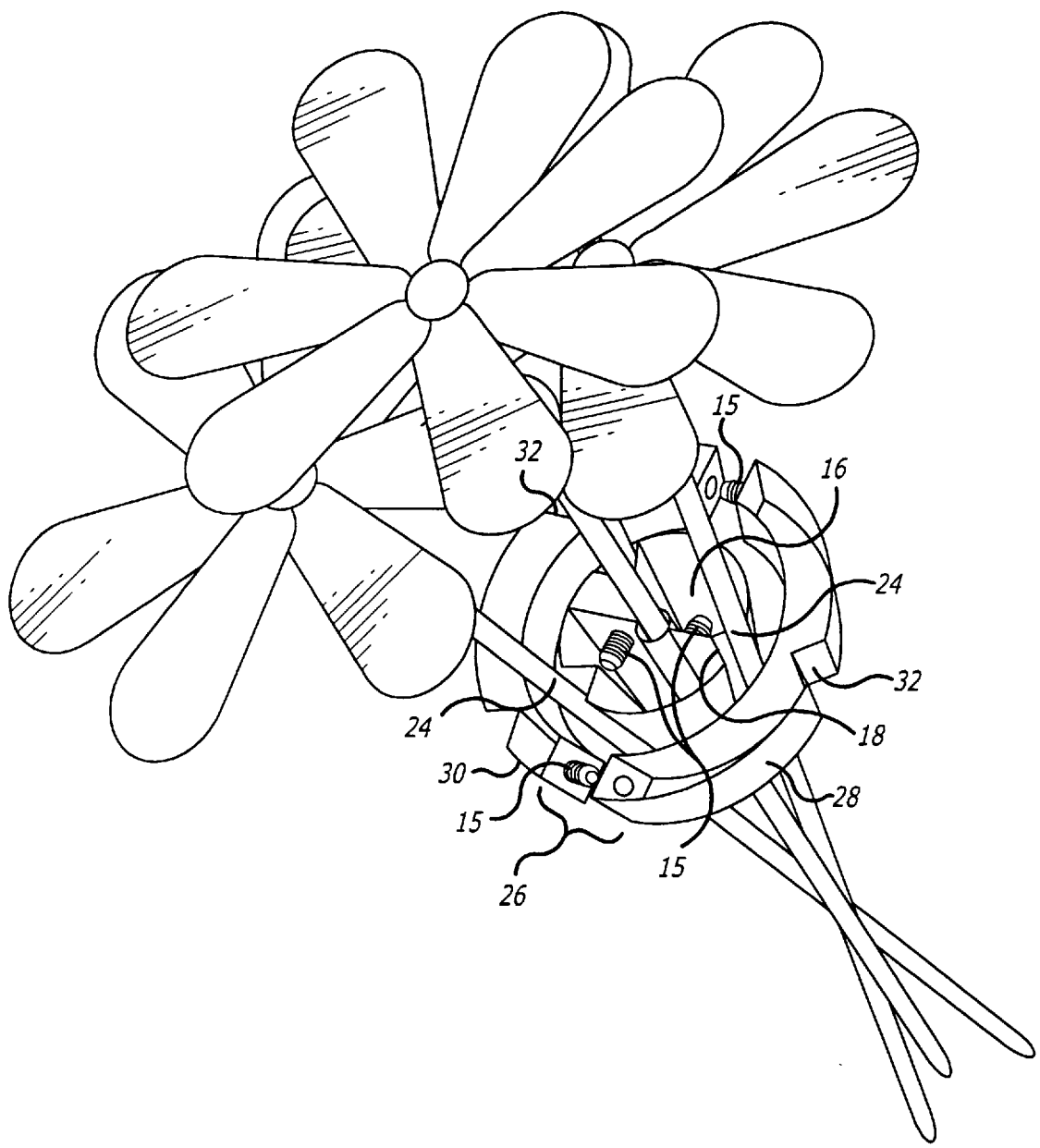
FIG. 3 shows a perspective view of the partially assembled floral bouquet showing the addition of an outer member to secure the flower stems into place.

Referring to FIG. 3, flower stems 24 are placed in the flower channels 18 of the central member 16. Three flower channels 18 are shown here. An outer member 26, having a first side member 28 and a second side member 30, having a second plurality of flower channels 32 on the out side surface is placed around the placed flowers, thereby securing them into position. The outer member nests with the center member.

Figure 4:
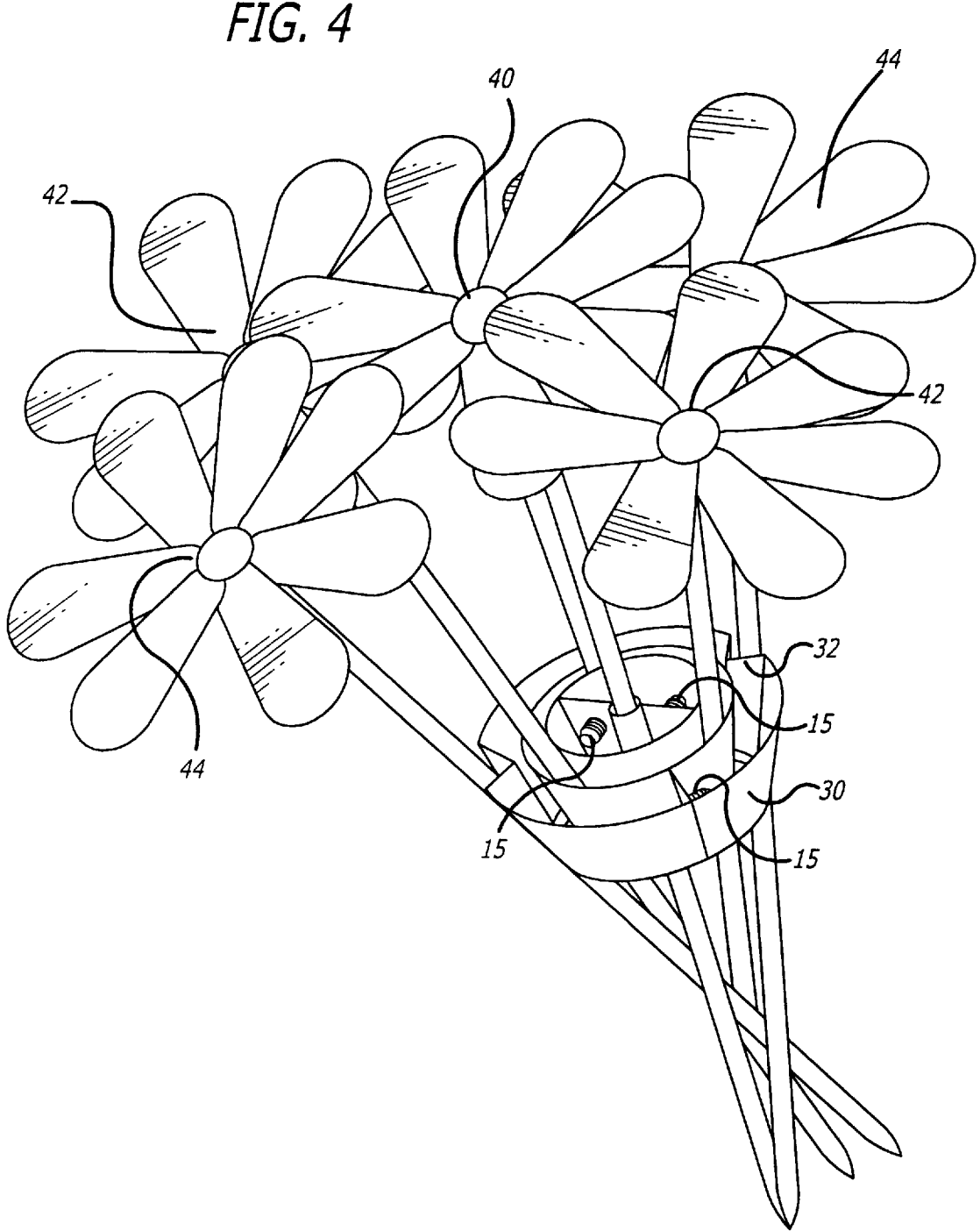
FIG. 4 shows a perspective view of the partially assembled floral bouquet showing the addition of yet the next layer of flowers to the arrangement.

Referring to FIG. 4, a second layer of flower stems is arranged on the outside of the assembled outer member 30, in the flower receiving channels 32. At this point in the arranging process, there is a central flower 40, a first layer of flowers 42 and a second layer of flowers 44. It should be realized that although flowers are being shown in the Figs., other foliage and the like can be added to the arrangement to give a polished and professional look to the final arrangement. It should also be realized that the floral arrangement can be held in the arrangers hand or placed in a vase or similar device to help steady the arrangement as it grows.

Figure 5:
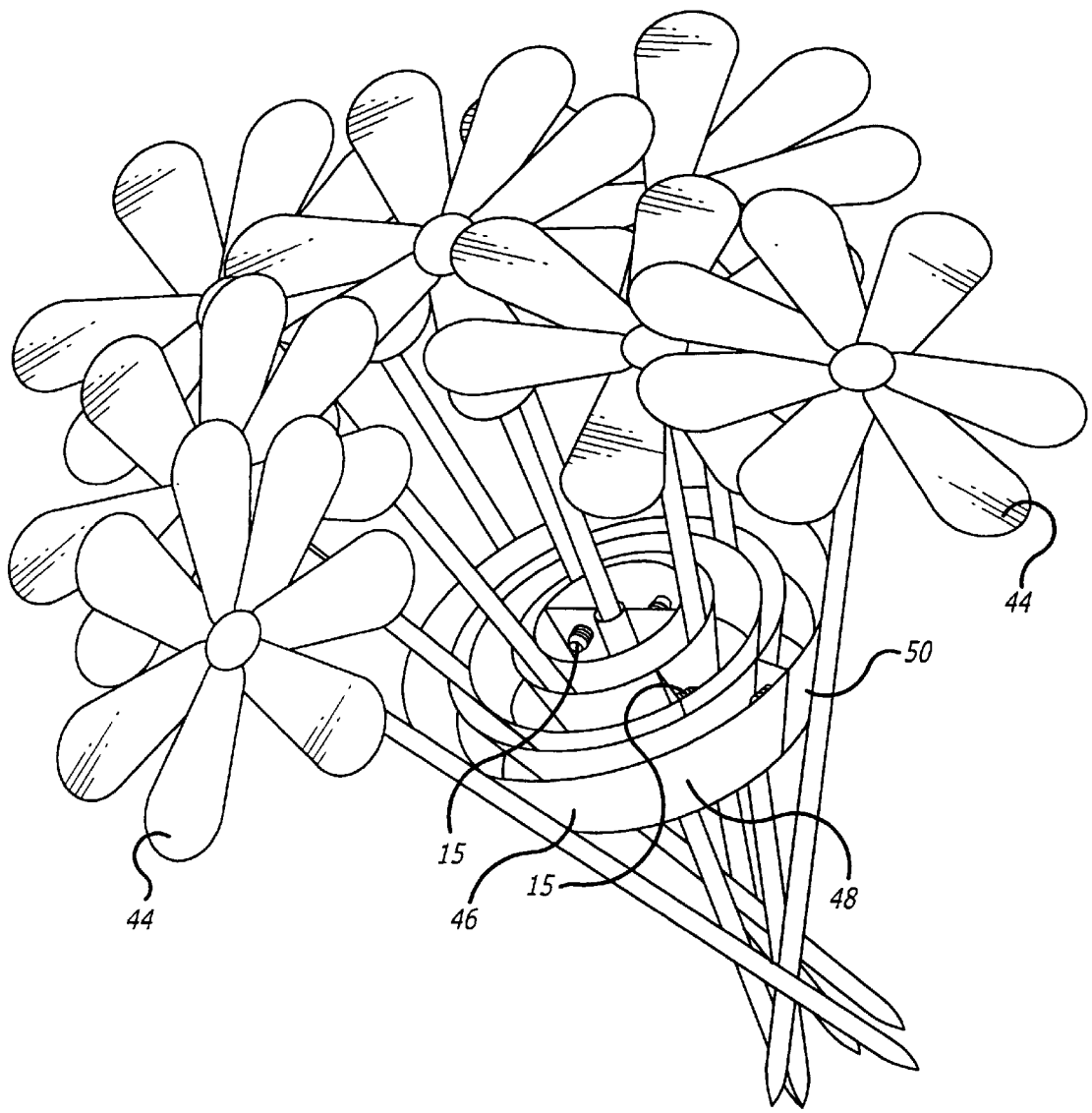
FIG. 5 shows a perspective view of the partially assembled flower arrangement of FIG. 4 showing the addition of yet another layer.

Referring to FIG. 5, the second layer of flowers 44 is secured by a second outer member 46. In a preferred embodiment, the second outer layer includes a first side member 48 and a second side member 50, shown assembled in the Fig. The first side member and the second side member are placed together, and joined. In a preferred embodiment, the side members are made of hard plastic and the first and second side members are snap 15 fit together. Fitting the two halves together as the flowers are arranged allows the arranger to account for any unfairness in the natural sizes of the stems of the flowers, and allow for a better and more reproducible fit of the arrangement. A third layer of flowers is placed around the second outer member.

Figure 6:
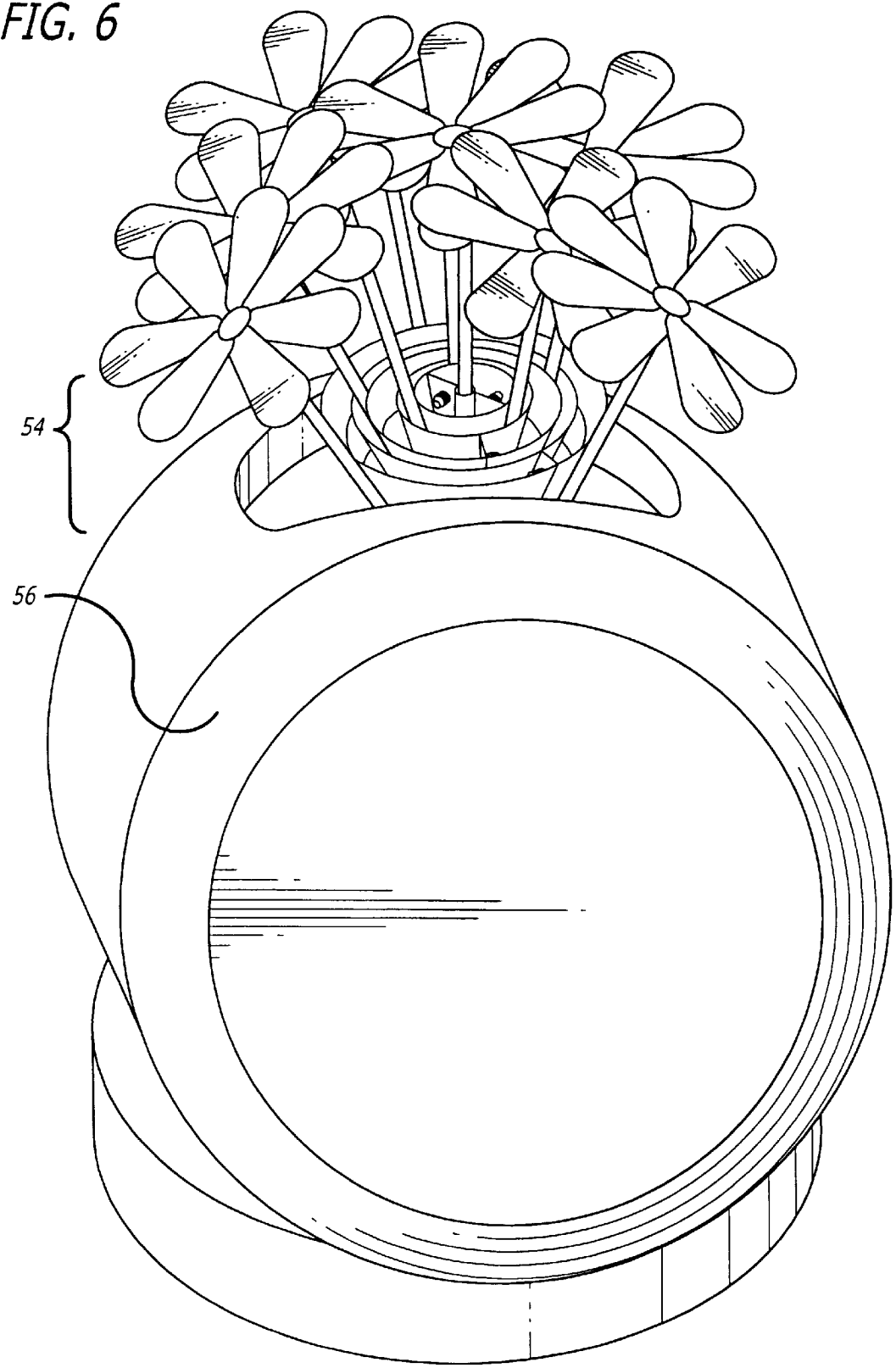
FIG. 6 shows a perspective view of the final arrangement, placed in a vase ready for display.

Finally, referring to FIG. 6, the arrangement of flowers 52 and the nested flower securing devices 54 are placed in a display device 56. In the device shown in this Fig. a central member is nested with two outer members. However, usually, more or fewer nested outer layers can be added depending on the size and the nature of the arrangement desired. The display device can be, for example, a conventional vase, including ceramic, glass, metal, and other materials that can hold flowers and are sufficiently waterproof. In one embodiment, the display device is a hand held device for bridal bouquets and the like. The invention allows a hand held bouquet, a "loose-tied" bridal bouquet, to be created that allows the flowers of the bouquet to be held apart and not crushed together. Another great advantages of this invention is that the arrangement can be used in a vase provided at the destination. In other words, the arrangement can be made, and transported to a destination, usually in a box, and then placed in a display device.

The central member and the surrounding members can be made of any reasonable material. Preferred materials include porous materials, for example, floral foam, styrofoam, foam polyurethane, and the like. Porous materials may be used when the flower support of the invention is to be the primary support and water supply for the entire bouquet. Conversely, non-porous materials may be used, for example, polyethylene, polypropylene, various high impact plastics and the like. Non-porous materials are used in the situation where the supporting member is used to place the bouquet in a vase or other water supplying source. Other materials and the like for example, metals, such as aluminum may also be beneficially used.

The central member and the surrounding members can be solid, that is, made of a block of material, or hollow, that is a shell having an outer side, an inner side, and a bottom or an outer side, an inner side and no bottom. The choice is dictated by weight considerations and secondary considerations such as the need for a holder for floral foam for foliage and the like. In general the choice of solid versus hollow will not affect the choice of material chosen for the members. The hollow portion of the members can be used for placing other flowers or foliage. Being hollow, it can be used to place floral foam and the like for supporting other flowers and foliage.

To some extent the material used depends on whether the flower supports are to be reused or not. The more reusable the flower support, the more robust the material should be.

It is preferred that the material be resilient against deformation caused by flower stems and the like. That is, it is preferred that the material chosen for construction of the apparatus of this invention hold the stems of the flowers in the arrangement firmly, and not allow the flower stems to work their way loose. This is especially important if the arrangement is to held or otherwise not held in a secure display device.

This invention allows the arrangement of various types of flowers, including roses, carnations, mums, and other long stem flowers. Other foliage may be arranged using the supporting members of this invention as well, such foliage including ferns, broad leaf foliage, babies breath and the like.

The display device chosen for the arrangement once made might be a vase, or a handle, in the case of a bouquet to be held by a bride or the like. The requirements for the display device are essentially that it be waterproof.

Figure 7:
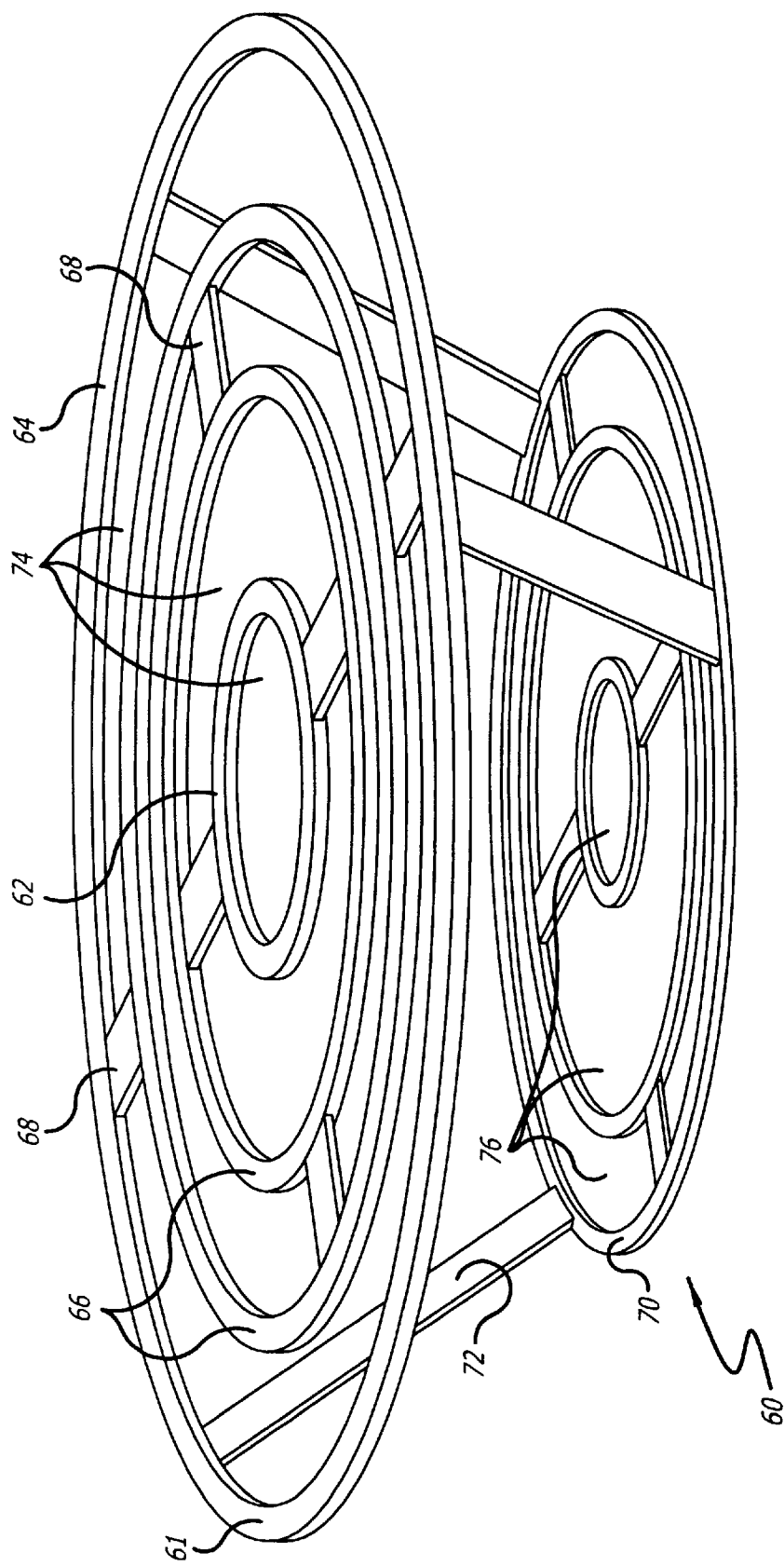
FIG. 7 shows a perspective view of an alternative embodiment showing a frame apparatus for arranging flowers without a vase.

Referring to FIG. 7, in an alternative embodiment 60 comprises an apparatus for arranging flowers. A top member 61 includes a center ring member 62 and at least one outer member 64 are connected to the center ring member by radially arrayed connecting members 68. In the Fig. Two additional ring members 66 are shown between the center ring member and the out ring member. A lower series of nested rings 70 is connected to the top series of nested rings by vertical supporting member 72. In this embodiment, the gaps 74 and 76 formed by the center ring member, the outer member and the connecting members define a plurality of flower channels. This embodiment is used by placing the apparatus in a vase or holding it in the hand and arranging flowers using the gaps in the apparatus.

This invention also provides a method for arranging flowers. The particular method is dependent on the nature of the apparatus used and the nature of the arrangement intended by the flower arranger. It must be realized that the bouquet may be held in the flower arranger's hand or placed in a vase or the like as the arrangement is being made.

The central member may or may not define a central aperture, but if one is present, then the first flower is placed therein. In the typical situation, first, a flower is placed in a central orifice of a central member. Then, flower stems are placed in a plurality of flower channels around the central member. Preferably, at least two to eight flower channels will exist around the central member. Herein, it will be assumed that there are three channels around the central member. At this point in the arranging process, there will be three flowers placed around the central member, and one in the center of the central member. The flower stems around the central member are secured by a placing a first surrounding member having a second plurality of flower channels around the first layer of arranged flowers. Similarly to the assumptions made above, herein it will be assumed that there are three flower channels around the first surrounding member, although, as above, there may be between two and eight flower channels around the first surrounding member. If the first outer member comprises a first side member with a second side member, this is the point in the creation of the bouquet that the arranger fits the first and the second side members together. The first surrounding member may be all that is required for the particular arrangement, but, more surrounding members may be added to arrange more flowers. Flower stems are the placed in the second plurality of around the first surrounding member. More layers of flowers can be placed in other surrounding members. Finally, the arranged flowers are placed in a display vase or the like.

As one example, one may have a central member with a central aperture and three flower channels. The first surrounding member has three flower channels and the second surrounding member has five flower channels. This way one dozen flowers may be easily, quickly, and reproducibly arranged, even by a novice or inexperienced florist. Then the arranged flowers may be placed in a vase, for example a ceramic or glass vase. In one embodiment of this invention, the flowers are not placed in a vase, but are held as a bridal bouquet or the like.

Once the arrangement has been made, the flowers in the arrangement will be easier to maintain, since the arrangement can be removed from the display device and new water and new food can be added to the display device, and the flowers can be given fresh cuts to maximize the amount of water and food they can take up. Flowers in such a bouquet will last appreciably longer than in a conventional bouquet.

This invention has been described with reference to specific embodiments and examples thereof. Alterations, modifications, and other changes will invariably suggest themselves to those of ordinary skill in the art. It is intended that the scope of this invention be determined solely by reference to the appended claims, and that the appended claims encompass all such alterations, modifications, and changes.

I claim:

1. An apparatus for arranging flowers comprising:
    a center member having a plurality of flower channels arranged in a radial array on the outer side surface;
    at least one outer member having a plurality of flower channels on the outside surface, the center member nested inside the outer member;
    said at least one outer member having an inside surface, portions of said inside surface on said outer member cooperating with the flower channels on the center member, said inside surface on said inside surface on said outer member acting as a barrier limiting movement of the flower beyond said inside surface; and
    said inside surface of said at least one outer member angled toward the center of the apparatus with the bottom portion of the inside surface closer to the center of apparatus than the top portion of the inside surface.

2. The apparatus for arranging flowers of claim 1 further comprising at least one rib separating said at least one outer member from said center member at a fixed distance.

3. The apparatus for arranging flowers of claim 1 wherein the center member has between two and eight flower channels on the outer surface of the center member.

4. The apparatus for arranging flowers of claim 1 wherein each outer member has between two and eight flower channels on the outer surface of the outer member.

5. The apparatus for arranging flowers of claim 1 wherein the center member defines a central aperture for receiving a flower stem.

6. The apparatus for arranging flowers of claim 1 wherein the outer member includes a first side member and a second side member.

7. The apparatus for arranging flowers of claim 6 wherein the first side member and the second side member are mateable.

8. The apparatus for arranging flowers of claim 7 including a graduated pin allowing the first and second side members to be mateably spaced at least two different distances apart from each other.

9. The apparatus for arranging flowers of claim 7 wherein the first side member and the second side member are permanently mateable.

10. A method for arranging flowers comprising:
    placing at least one stem of a flower in at least one flower channel of a center member, said at least one flower channel arranged on the outer side surface of the center member;
    surrounding the central member with a surrounding member having a second plurality of radially arrayed flower channels, said surrounding member having an inside surface, portions of said inside surface cooperating with said at least one flower channel on the center member, said inside surface on said outer member acting as a barrier limiting movement of the flower beyond said inside surface;
    at least a portion of said inside surface angled toward the center of the apparatus with the bottom portion of said portion of the inside surface closer to the center of apparatus than the top portion of said inside surface;
    placing at least one stem of a flower in one of the second plurality of flower channels; and
    placing the arranged flowers in a display vase or display device.

11. The method for arranging flowers of claim 10 further including the step of providing at least one rib separating said center member from said surrounding member at a fixed distance.

12. The method of arranging flowers of claim 10 further including the step of placing a flower stem in a central flower stem receiving orifice defined in the center member.

13. The method of arranging flowers of claim 10 further including the step of placing flower stems in between two and eight flower channels defined on the surface of the center member.

14. The method of arranging flowers of claim 10 further including the step of placing flower stems in between two and eight flower channels defined on the surface of each outer member.

15. The method of arranging flowers of claim 14 further including the step of placing a flower stem in a central aperture defined in the center member.

16. The method of arranging flowers of claim 10 further including the steps of fitting a first side member and a second side member together to form an outer member.

17. The method for arranging flowers of claim 10 wherein the method further includes the steps of surrounding a first surrounding member having flower stems placed in a plurality of flower channels with a second surrounding member; and
    placing flower stems in a plurality of flower channels.

18. The method of arranging flowers of claim 10 further including the step of binding the stems of the arranged flowers together to form a bundle.

19. An apparatus for arranging flowers comprising:
    a central member defining a central aperture and having a plurality of flower channels radially arrayed on the outer side surface;
    at least one outer member having a first side member and second side member, the first and second side members having a means to join each other, and the outer member having a plurality of flower channels radially arrayed on the outside surface, the center member nested inside the outer member; said outer member having an inside surface, said inside surface on said outer member acting as a barrier limiting movement of the flower beyond said inside surface; and at least one of said flower channels angled toward the center of the apparatus with the bottom portion of said flower channel closer to the center of apparatus than the top portion of said flower channel.

20. The apparatus for arranging flowers of claim 19 wherein the center member has between two and eight flower channels.

21. The apparatus for arranging flowers of claim 20 wherein the first side member and the second side member are permanently mateable.

22. The apparatus for arranging flowers of claim 19 wherein each outer member has between two and eight flower channels.

23. The apparatus for arranging flowers of claim 19 wherein the center member defines a central aperture for receiving a flower.

24. The apparatus for arranging flowers of claim 22 wherein the first side member and the second side member are mateable.

25. The apparatus for arranging flowers of claim 24 including a graduated pin allowing the first and second side members to be mateably spaced at least two different distances apart from each other.

26. The apparatus for arranging flowers of claim 19 wherein the outer member includes a first side member and a second side member.

27. An apparatus for arranging flowers comprising:
a first level including a center ring member and at least one outer member connected to the center ring member by radially arrayed connecting members forming a plurality of flower channels at the first level;
said first level having a first level perimeter;
a second level including a center ring member, at least one outer member connected to the center ring member by radially arrayed connecting members, said second level having a second level perimeter shorter than the first level perimeter, the gaps formed by the center ring member, the outer member and the connecting members defining a plurality of flower channels said first and second level flower channels adapted to receive flowers passing between said first and second levels.

28. An apparatus for arranging flowers comprising:
a center member having a plurality of flower channels arranged in a radial array on the outer side surface;
at least one outer member having a plurality of flower channels on the outside surface, the center member nested inside the outer member;
said at least one outer member having an inside surface, portions of said inside surface cooperating with the flower channels on the center member, said portions of said inside surface on said outer member acting as a barrier limiting movement of the flower beyond said inside surface;
at least a portion of said inside surface angled toward the center of the apparatus with the bottom portion of said portion of the inside surface closer to the center of apparatus than the top portion of said inside surface; and
said outer member further comprising at least two joining portions which mate to each other to form the outer member nesting the center member.

29. An apparatus for arranging flowers comprising:
a central member defining a central aperture and having a plurality of flower channels radially arrayed on the outer side surface, said flower channels not defined by an outside radial boundary on said central member;

at least one outer member having a first side member and second side member, the first and second side members having a means to join each other, and the outer member having a plurality of flower channels radially arrayed on the outside surface, the center member nested inside the outer member;
portions on the outer member defining the outside radial boundary of the flower channels on the central member having an inside surface on said outer member acting as a barrier limiting movement of the flower beyond said inside surface; and
at least one of said flower channels angled toward the center of the apparatus with the bottom portion of said flower channel closer to the center of apparatus than the top portion of said flower channel.

30. An apparatus for arranging flowers comprising:
a first level including a first level center member and at least one first level outer member connected to the first level center member by at least one connecting member;
gaps formed by the first level center member, the first level outer member and the connecting member defining a plurality of first level flower channels;
said first level having a first level perimeter;
a second level including a second level center member, at least one second level outer member connected to the second level center member by at least one connecting member, said second level having a second level perimeter shorter than the first level perimeter;
gaps formed by the second level center member, the second level outer member and the connecting member defining a plurality of second level flower channels and said first and second level flower channels adapted to receive flowers passing between said first and second levels.

31. An apparatus for arranging flowers comprising:
a first level including a first level center member and a first level outer member;
said first level including a first level inner member connected between the first level center member and the first level outer member by a plurality of connecting members;
gaps formed by the first level center member, the first level inner member, the first level outer member and the connecting members defining a plurality of flower channels;
a second level including a second level center member and a second level outer member;
said second level outer member connected to said second level center member by connecting members;
gaps formed by the second level center member, the second level outer member and the connecting members defining a plurality of second level flower channels and said first and second level flower channels adapted to receive flowers passing between said first and second levels.

32. An apparatus for arranging flowers comprising:
a first level including a first level center member, a first level outer member and a plurality of first level inner member, said plurality of first level inner members positioned between the first level center member and the first level outer member;
said first level center member, first level outer member and said plurality of first level inner members connected by a plurality of connecting members;

gaps formed by the first level center member, the first level outer member, the first level inner members and the connecting members defining a plurality of flower channels;

a second level including a second level center member, a second level outer member and at least one second level inner member;

the second level including at least one fewer second level inner members than the number of first level inner members;

said second level center member, said at least one second level inner member and said second level outer members connected by a plurality of connecting members;

gaps formed by the second level center member, the second level outer member and the connecting members defining a plurality of second level flower channels and said first and second level flower channels adapted receive flowers passing between said first and second levels.

* * * * *